United States Patent [19]

Oi et al.

[11] Patent Number: 4,512,898

[45] Date of Patent: Apr. 23, 1985

[54] PACKING MATERIALS FOR CHROMATOGRAPHIC USE AND A METHOD FOR ANALYSIS OF AN ENANTIOMER MIXTURE USING THE SAME

[75] Inventors: Naobumi Oi, Kyoto; Hajimu Kitahara, Osaka, both of Japan

[73] Assignee: Sumitomo Chemical Company, Limited, Japan

[21] Appl. No.: 538,011

[22] Filed: Sep. 30, 1983

[30] Foreign Application Priority Data

Sep. 30, 1982 [JP] Japan .................................. 57-173003
Oct. 1, 1982 [JP] Japan .................................. 57-173688

[51] Int. Cl.$^3$ ............................................. B01D 15/08
[52] U.S. Cl. .................................. 210/656; 210/198.2; 210/302; 210/502.1; 55/386; 502/402; 502/407
[58] Field of Search .................... 210/636, 198.2, 502; 55/67, 386; 502/401, 402, 403, 407

[56] References Cited

U.S. PATENT DOCUMENTS

| | | | |
|---|---|---|---|
| 3,960,521 | 6/1976 | Kruppa ................................... | 55/67 |
| 3,984,349 | 10/1976 | Meiller et al. ....................... | 210/656 |
| 4,190,425 | 2/1980 | Brüening et al. .................... | 210/656 |
| 4,322,310 | 3/1982 | House ................................... | 210/635 |
| 4,324,681 | 4/1982 | House ................................... | 210/635 |
| 4,368,275 | 1/1983 | Yanagihara et al. ................. | 210/656 |

OTHER PUBLICATIONS

"Resolution of Optical Isomers—Stationary Phases" by Mikes et al., Journal of Chromatography, 122 (1976), 205-221.
"Liquid Chromatographic Resolution of Enantiomers—Silica Gel" by Hara et al., Journal of Chromatography, 186 (1979), 543-552.
"Broad Spectrum Resolution of Optical Isomers—Bonded Phases" by Pirkle et al., Journal of Chromatography, 192 (1980), 143-158.
"Ligand–Exchange Chromatography" by Davankov, Journal of Chromatography, 141 (1977), 313-353.
"Chiral High-Pressure Liquid Chromatography Stationary Phases" by Pirkle et al., J. Org. Chem. 1981, 46, 2935-2938.
"Chromatographic Resolution of Enantiomers Selective Review" by Lochmüller et al., Journal of Chromatography, 113 (1975), 283-302.
"Optical Resolution of the D– L–Amino Acid Family by Liquid–Solid Chromatography" by Kirk et al., Journal of American Chemical Soc. 1980, 102, 7122-7123.
"A Widely Useful Chiral Stationary Phase—Separation of Enantiomers" by Pirkle et al., J. Am. Chem. Soc. 1981, 103, 3964-3966.

*Primary Examiner*—John Adee
*Attorney, Agent, or Firm*—Sughrue, Mion, Zinn, Macpeak, and Seas

[57] ABSTRACT

A packing material for chromatographic use comprising an inorganic carrier having hydroxyl groups at the surface thereof having grafted thereon an organosilane derivative selected from the group consisting of a urea derivative obtained by reacting an optically active isocyanate with an aminoalkylsilane, an N-carbomoyl amino acid derivative obtained by reacting an optically active amino acid carbamoylated by isocyanate with an aminoalkylsilane and an O-carbamoyl hydroxy acid derivative obtained by reacting an optically active hydroxy acid carbamoylated by isocyanate with an aminoalkylsilane is disclosed. This packing material is useful as a packing material for liquid chromatography analysis which comprises separating and analyzing an enantiomer mixture of a compound having an —OH group, a —CONH— group, $$a \text{ —CON— group,} \atop |$$

a —COO— group, an —NHCOO— group, an —NHCONH— group or $$\text{an —NHCON— group} \atop |$$

bonded to an asymmetric carbon atom thereof.

12 Claims, 6 Drawing Figures

PACKING MATERIALS FOR CHROMATOGRAPHIC USE AND A METHOD FOR ANALYSIS OF AN ENANTIOMER MIXTURE USING THE SAME

FIELD OF THE INVENTION

The present invention relates to a novel packing material for chromatographic use comprising an inorganic carrier and an optically active organosilane grafted on the carrier and a method for analysis of enantiomer mixtures of compounds containing an —OH group, a —CONH— group, $$a \text{ —CON—}\text{ group,}$$
   | a —COO— group, an —NHCOO— group, an —NHCONH— group or $$an \text{ —NHCON—}\text{ group}$$
   | bonded to an asymmetric carbon atom thereof which comprises separating the enantiomer mixtures using the packing material by means of liquid chromatography.

BACKGROUND OF THE INVENTION

As methods for directly separating and analyzing enantiomer mixtures of compounds containing an asymmetric carbon atom using optically active compound-grafted packing materials by means of liquid chromatography, there have been reported heretofore a method comprising ligand exchange using optically active proline-grafted packing materials by Davankov et al.; a method involving electron transfer complexes using $\pi$-electron-lacking, optically active compound-grafted packing materials by Gil-Av et al.; a method involving separation of N-acylated amino acid esters or N-acylated dipeptide esters using optically active N-acylated amino acid-grafted packing materials by Hara et al.; a method involving separation of 3,5-dinitrobenzoylated amino acids, amines, hydroxy acids, sulfoxides, etc. using optically active 1-(9-anthryl)trifluoroethanol-grafted packing materials, or a method involving separation of aromatic alcohols using 3,5-dinitrobenzylated, optically active phenylglycine-grafted packing materials by Pirkle et al.; and so on. In these methods, however, the compounds capable of being separated are limited to a narrow range, the degree of separation is poor, or grafted packing materials are produced with difficulty so that packing materials having good reproducibility in the quality, etc. are difficult to produce. It cannot thus be said that these packing materials are practical.

As a result of extensive investigations in an attempt to develop grafted packing materials which are widely applicable to compounds to be analyzed, are relatively easily prepared, are chemically stable and are practical, the present inventors have found that packing materials for chromatographic use obtained by grafting organosilane derivatives selected from the group consisting of urea derivatives obtained by reacting optically active isocyanates with aminoalkylsilanes, N-carbamoyl amino acid derivatives obtained by reacting optically active amino acids carbamoylated by isocyanate with aminoalkylsilanes, and O-carbamoyl hydroxy acid derivatives obtained by reacting optically active hydroxy acids carbamoylated by isocyanate with aminoalkylsilanes, on inorganic carriers having hydroxyl groups at the surface thereof are extremely useful since they not only exhibit an excellent effect for separating enantiomer mixtures of compounds containing an —OH group, a —CONH— group, $$a \text{ —CON—}\text{ group,}$$
   | a —COO— group, an —NHCOO— group, an —NHCONH— group or $$an \text{ —NHCON—}\text{ group}$$
   | bonded to an asymmetric carbon atom thereof, but also can easily be prepared by ordinary chemical reactions and are chemically stable, and have reached the present invention.

SUMMARY OF THE INVENTION

An object of the present invention is to provide a packing material for chromatographic use comprising an inorganic carrier having hydroxyl groups at the surface thereof to which an organosilane derivative selected from the group consisting of a urea derivative obtained by reacting an optically active isocyanate with an aminoalkylsilane, an N-carbamoyl amino acid derivative obtained by reacting an optically active amino acid carbamoylated by isocyanate with an aminoalkylsilane and an O-carbamoyl hydroxy acid derivative obtained by reacting an optically active hydroxy acid carbamoylated by isocyanate with an aminoalkylsilane is grafted.

Another object of the present invention is to provide a method for separating and analyzing an enantiomer mixture of a compound containing an —OH group, a —CONH— group, $$a \text{ —CON—}\text{ group,}$$
   | a —COO— group, an —NHCOO— group, an —NHCONH— group or $$an \text{ —NHCON—}\text{ group}$$
   | bonded to an asymmetric carbon atom thereof by using the above described packing material as a stationary phase for liquid chromatography.

DETAILED DESCRIPTION OF THE PREFERRED EMBODIMENTS

Figure 1:
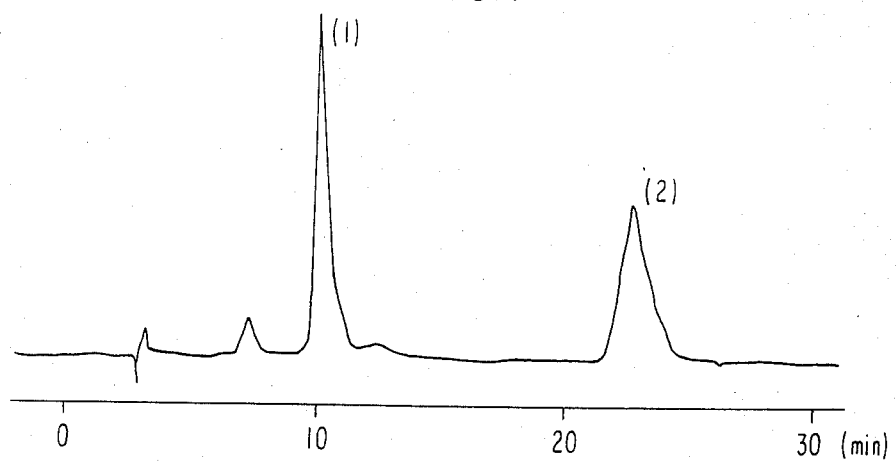
FIGS. 1, 2, 3, 4, 5 and 6 are chromatograms obtained in Examples 1, 2, 3, 4, 5 and 6, respectively, wherein the vertical axis represents the intensity and the abscissa represents the time period for retention.

In the present invention, the grafted organosilane derivatives are compounds represented by general formula:

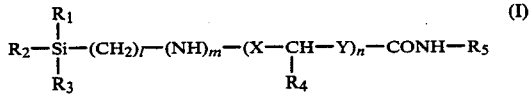

wherein $R_1$, $R_2$ and $R_3$ each, which may be the same or different, is an alkyl group, an alkoxyl group, a hydroxyl group or a halogen atom, with proviso that at least one of $R_1$, $R_2$ and $R_3$ is an alkoxyl group or a halogen atom; $R_4$ is an alkyl group, an aryl group or an aralkyl group; $R_5$ is an alkyl group, an aryl group or an aralkyl group which may be substituted with an aryl group including those groups which are optically active substituents; X is an —NHCO— group or an —N$^\oplus$H$_3$.O$^\ominus$CO— group; Y is an —NH— group or an oxygen atom; l is 2, 3 or 4; and m and n each is 0 or 1 wherein n is 1 when m is 0, and n is 0 when m is 1, with proviso that $R_5$ is an optically active aralkyl group when m is 1.

More specifically, as the aminoalkylsilane components which constitute the moiety represented by formula:

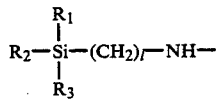

or

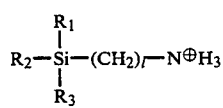

in the foregoing general formula (I), ω-aminoalkylalkoxysilanes and ω-aminoalkylhalogenosilanes are preferred. Specific examples include ω-aminopropyltriethoxysilane, ω-aminopropyltrichlorosilane, etc.

As optically active amino acids or hydroxy acids which constitute the moiety represented by formula:

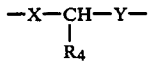

α-alkyl amino acids, α-aryl amino acids, α-alkyl hydroxy acids, α-aryl hydroxy acids, etc. are preferred. Specific examples include L-valine, D-phenylglycine, (S)-mandelic acid, (R)-mandelic acid, L-lactic acid, etc.

As substituent $R_5$, it is preferred that, when m is 1 in the foregoing general formula (I), $R_5$ should be an optically active lower alkyl group at the α-position of which an aryl group is substituted or an optically active aralkyl group at the α-position of which an aryl group is substituted. Specific examples include an optically active 1-phenylethyl group, an optically active 1-(α-naphthyl)ethyl group, an optically active 1-phenyl-2-(4-tolyl)ethyl group, etc. It is also preferred that when m is 0, $R_5$ should be a lower alkyl group, an aryl group or an optically active aralkyl group. Specific examples include an n-propyl group, an isopropyl group, a tert-butyl group, a phenyl group, a 3,5-dinitrophenyl group, an α-naphthyl group, an optically active 1-(α-naphthyl)ethyl group, an optically active 1-phenylethyl group, an optically active 1-phenyl-2-(4-tolyl)ethyl group, etc.

In the present invention, as inorganic carriers having hydroxyl groups at the surface thereof, silica-containing carriers, e.g., silica gel, are preferred. Shapes of carriers may be any of spherical, ground ones, etc. To obtain columns for chromatographic use having high performance, fine grains having a size as uniform as possible are preferred.

In preparing novel packing materials for chromatographic use in accordance with the present invention, a variety of grafting methods can be adopted as shown below.

(1) A method which comprises reacting aminoalkylsilanes with inorganic carriers having hydroxyl groups at the surface thereof to introduce the aminoalkylsilyl residue at the surface of the inorganic carriers and reacting optically active isocyanates therewith or reacting optically active amino acids or hydroxy acids carbamoylated by isocyanate therewith.

More specifically, aminoalkylsilanes represented by general formula (II):

wherein $R_1$, $R_2$, $R_3$, and l have the same meanings as defined above, are reacted with inorganic carriers having hydroxyl groups at the surface thereof to introduce the aminoalkylsilyl residue at the surface of the inorganic carriers in a conventional manner, then optically active isocyanates represented by general formula (III):

wherein $R'_5$ is an optically active aralkyl group, are reacted with the resulting inorganic carriers, or, optically active N-carbamoyl amino acids or O-carbamoyl hydroxy acids represented by general formula (IV):

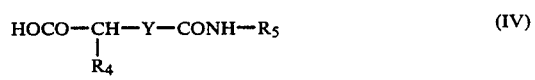

wherein $R_4$, $R_5$ and Y have the same meanings as defined above, are dehydration-condensed with or ionically bonded to the resulting inorganic carriers to obtain the desired packing materials.

The optically active isocyanates shown by the foregoing general formula (III) can be obtained in a conventional manner, e.g., by reacting 1-phenylethylamine, 1-(α-naphthyl)ethylamine or 1-phenyl-2-(4-tolyl)ethylamine with phosgene.

Further, the N-carbamoyl amino acids or O-carbamoyl hydroxy acids can be obtained by reacting, e.g., n-propyl isocyanate, isopropyl isocyanate, tert-butyl isocyanate, phenyl isocyanate, 3,5-dinitrophenyl isocyanate, optically active 1-phenylethyl isocyanate, optically active 1-(α-naphthyl)ethyl isocyanate or optically active 1-phenyl-2-(4-tolyl)ethyl isocyanate with sodium salts of amino acids such as L-valine or D-phenylglycine, etc. in an aqueous solution, or with triethylamine salts of hydroxy acids such as (S)-mandelic acid, etc. in dry tetrahydrofuran.

(2) A method which comprises reacting aminoalkylsilanes with optically active isocyanates or reacting aminoalkylsilanes with N-carbamoylated amino acids or O-carbamoylated hydroxy acids and then grafting the resulting organosilane derivatives on inorganic carriers having hydroxyl groups at the surface thereof.

More specifically, aminoalkylsilanes are reacted with isocyanates represented by general formula (III) described above, or with optically active N-carbamoyl amino acids or O-carbamoyl hydroxy acids represented by general formula (IV) described above, and the resulting organosilane derivatives represented by general formula (I) are grafted on inorganic carriers such as silica gel, etc. to obtain the aimed packing materials.

The packing materials for chromatographic use obtained in accordance with the present invention are packed in a column for chromatographic use in a conventional manner, and the packed column is employed as a stationary phase for liquid chromatography.

In the case of grafting method (1) described above, a stationary phase for liquid chromatography can also be prepared likewise by reacting aminoalkylsilanes represented by general formula (II) with inorganic carriers such as silica gel, etc. to introduce the aminoalkylsilyl residue at the surface of the inorganic carriers, previously packing the resulting packing materials in a column for chromatographic use in a conventional manner and then grafting on the resulting inorganic carriers isocyanates represented by general formula (III) described above or N-carbamoyl amino acids or O-carbamoyl hydroxy acids represented by general formula (IV) within the column.

By choosing appropriate conditions for elution, particularly conditions for normal phase partition or reversed phase partition often employed conventionally in liquid chromatography using the stationary phase, enantiomer mixtures of compounds containing an —OH group, a —CONH— group,

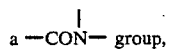

a —COO— group, an —NHCOO— group, an —NHCONH— group or

bonded to an asymmetric carbon atom thereof can be separated and analyzed with good separability in a short period of time.

Hereafter the present invention will be described in more detail with reference to the examples below.

EXAMPLE 1

After 10 g of silica gel (average grain size 10 μm, average pore size 60 Å, surface area 500 m²/g) was dried at 130° C. for 4 hours under reduced pressure, silica gel was added to a solution of 20 g of 3-aminopropyltriethoxysilane in 200 ml of dry toluene. The resulting mixture was stirred at 60° C. for 6 hours. The reaction mixture was filtered, and the residue was washed with 100 ml of acetone and dried to obtain 3-aminopropylsilylated silica gel (hereafter simply referred to as APS).

The elemental analysis of the silica gel showed N: 1.20% and C: 3.40%, which means that 0.90 mmol of the 3-aminopropyl group was grafted based on 1 g of the silica gel.

Separately, 145 g of trichloromethyl chloroformate was carefully poured to 500 ml of toluene. The resulting mixture was gently shaken, and 1 g of active carbon particles were added thereto. The mixture was allowed to stand overnight to mildly generate phosgene. Thereafter, the active carbon was filtered off, and a solution of 31 g of R(+)-1-(α-naphthyl)ethylamine in 50 ml of toluene was added to the filtrate, followed by stirring the mixture.

Then, the mixture was heated for 4 hours under reflux condition and then allowed to cool. Excess of phosgene and the solvent toluene were evaporated under reduced pressure to obtain 35.3 g of R(−)-1-(α-naphthyl)ethyl isocyanate. The product was a viscous yellowish brown liquid at room temperature.

Optical rotation: $[\alpha]_D^{20} = -54.6°$ (c=0.83%, toluene)
Elemental Analysis:

|  | Carbon (%) | Hydrogen (%) | Nitrogen (%) |
| --- | --- | --- | --- |
| Calcd. | 79.17 | 5.62 | 7.10 |
| Found (for $C_3H_{11}NO$) | 78.98 | 5.67 | 6.97 |

Then, 1.5 g of the thus obtained compound was added to a suspension of 2.5 g of the aforesaid APS in 20 ml of dry toluene which had been thoroughly degassed under reduced pressure. While stirring, the resulting mixture was heated for 6 hours under reflux condition. After allowing to cool to room temperature, the reaction mixture was washed three times with 20 ml of toluene and then with 30 ml of acetone, twice with 30 ml of methanol, and further twice with 30 ml of diethyl ether, followed by drying to obtain the aimed packing material having grafted thereon R(−)-1-(α-naphthyl)ethyl isocyanate (hereinafter simply referred to as NEC-Si). The elemental analysis of the packing material showed N: 1.94% and C: 11.9%, which means that 0.62 mmol of R(−)-1-(α-naphthyl)ethyl isocyanate had been grafted based on 1 g of the packing material.

The thus obtained packing material was packed as a slurry in a stainless steel-made column having an inner diameter of 4 mm and a length of 25 cm, and N-(3,5-dinitrobenzoyl)-(±)-1-(α-naphthyl)ethylamine was analyzed under the following conditions to obtain a chromatogram shown in FIG. 1.

Temperature: room temperature
Mobile Phase: hexane/dichloromethane/ethanol (15:4:1)
Flow Rate: 1.0 ml/min.
Detector: UV photometer (wavelength 254 nm)

In FIG. 1, peak Nos. (1) and (2) show peaks of N-(3,5-dinitrobenzoyl)-(−)-1-(α-naphthyl)ethylamine and N-(3,5-dinitrobenzoyl)-(+)-1-(α-naphthyl)ethylamine, respectively. A time period required for eluting the peak No. (2) was for about 25 minutes, a separation factor was 2.70, and a ratio of the peak area No. (1) to the peak No. (2) was 50:50.

EXAMPLE 2

In 20 ml of a 1N sodium hydroxide aqueous solution was dissolved 3.0 g of D-phenylglycine, and 4 ml of tetrahydrofuran was added to the solution. While stirring, 4.0 g of R(−)-1-(α-naphthyl)ethyl isocyanate was added to the mixture. Stirring was continued overnight at room temperature. After 10 ml of 1N sodium hydroxide aqueous solution and 30 ml of water are added to the reaction mixture, the resulting mixture was washed twice with 50 ml of ethyl acetate and then acidified with 6N hydrochloric acid. The formed white solid substance was extracted three times with 100 ml of ethyl acetate. The extract was washed twice with 100 ml of water. After drying over anhydrous sodium sulfate and then concentrating under reduced pressure, recrystallization was carried out from an ethyl acetate-hexane mixture to obtain 3.1 g of N-{(R)-1-(α-naphthyl)ethylcarbamoyl}-D-phenylglycine as white crystals.

Melting Point (Decomposed): 201°-202° C.

Optical Rotation: $[\alpha]_D^{20} = -126°$ (c=0.87%, methanol)

Elemental Analysis:

|  | Carbon (%) | Hydrogen (%) | Nitrogen (%) |
| --- | --- | --- | --- |
| Calcd. | 72.40 | 5.79 | 8.04 |
| Found (for $C_{21}H_{20}N_2O_3$) | 72.26 | 5.77 | 7.93 |

Then, 1.74 g of this compound was dissolved in 20 ml of a methanol-tetrahydrofuran (1:1) mixture. The solution was added to 2.5 g of APS obtained in Example 1 to cause suspension. After the suspension was thoroughly degassed under reduced pressure, the suspension was gently stirred overnight at room temperature. The reaction mixture was washed four times with 30 ml of tetrahydrofuran, twice with 30 ml of methanol and further twice with 30 ml of diethyl ether. After drying, the desired packing material having grafted thereon N-{(R)-1-(α-naphthyl)ethylcarbamoyl}-D-phenylglycine (hereafter simply referred to as NEC-PHG-Si) was obtained. The elemental analysis of the packing material showed N: 2.10% and C: 12.8%, which means that about 0.45 mmol of N-{(R)-1-(α-naphthyl)ethylcarbamoyl}-D-phenylglycine had been grafted based on 1 g of the packing material.

Figure 2:
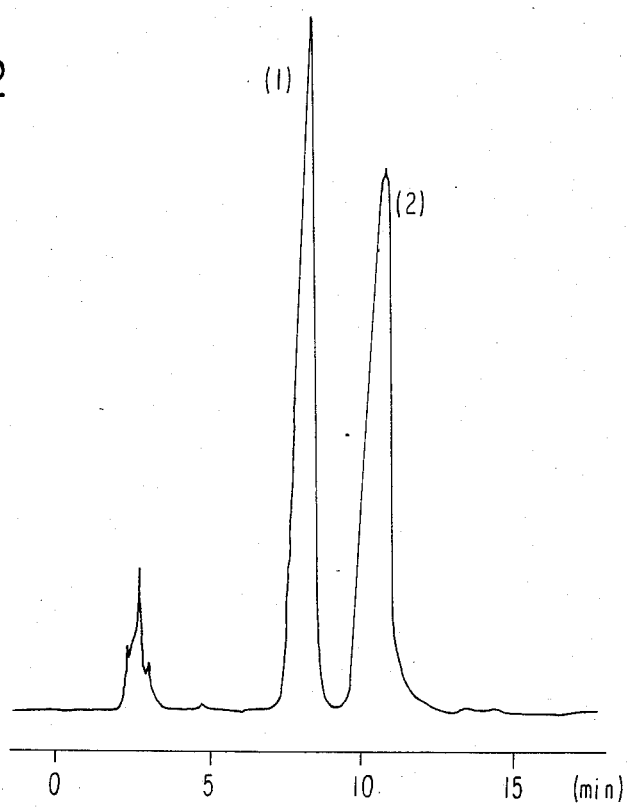

The thus obtained packing material was packed as a slurry in a stainless steel-made column having an inner diameter of 4 mm and a length of 25 cm, and O-(3,5-dinitrophenylcarbamoyl)-(±)-1-phenylethyl alcohol was analyzed under the following conditions to obtain a chromatogram shown in FIG. 2.

Temperature: room temperature
Mobile Phase: hexane/dichloromethane/ethanol (15:4:1)
Flow Rate: 1.0 ml/min.
Detector: UV photometer (wavelength 254 nm)

In FIG. 2, peak Nos. (1) and (2) show peaks of O-(3,5-dinitrophenylcarbamoyl)-(−)-1-phenylethyl alcohol and O-(3,5-dinitrophenyl)-(+)-1-phenylethyl alcohol, respectively. A time period required for eluting the peak No. (2) was for about 12 minutes, a separation factor was 1.41, and a ratio of the peak area No. (1) to the peak area No. (2) was 50:50.

EXAMPLE 3

S(+)-1-Phenyl-2-(4-tolyl)ethyl isocyanate was obtained by reacting S(+)-1-phenyl-2-(4-tolyl)ethylamine with phosgene in a manner similar to the process for preparing R(−)-1-(α-naphthyl)ethyl isocyanate in Example 1. The product was a pale yellow liquid at room temperature.

Optical Rotation: $[\alpha]_D^{20} = 14.0°$ (c=1.74%, toluene)
Elemental Analysis:

|  | Carbon (%) | Hydrogen (%) | Nitrogen (%) |
| --- | --- | --- | --- |
| Calcd. | 80.99 | 6.37 | 5.90 |
| Found (for $C_{16}H_{15}NO$) | 80.72 | 6.43 | 5.78 |

Separately, 3.78 g of D-phenylglycine was dissolved in 25 ml of a 1N sodium hydroxide aqueous solution, and 5 ml of tetrahydrofuran was added to the solution. While stirring, 5.22 g of the aforesaid S(+)-1-phenyl-2-(4-tolyl)ethyl isocyanate was added, and the stirring was continued overnight at room temperature. After 10 ml of a 1N sodium hydroxide aqueous solution was added to the reaction mixture, the resulting mixture was washed twice with 40 ml of ethyl acetate and acidified with 6N hydrochloric acid. The formed white solid substance was extracted three times with 100 ml of ethyl acetate.

The extract was washed twice with 100 ml of water. After drying over anhydrous sodium sulfate and then concentrating under reduced pressure, recrystallization was carried out from an ethyl acetate-hexane mixture to obtain 5.7 g of N-{(S)-1-phenyl-2-(4-tolyl)ethylcarbamoyl}-D-phenylglycine as white crystals.

Melting Point (Decomposed): 173°-175° C.

Optical Rotation: $[\alpha]_D^{20} = -83°$ (c=0.39%, methanol)

Elemental Analysis:

|  | Carbon (%) | Hydrogen (%) | Nitrogen (%) |
| --- | --- | --- | --- |
| Calcd. | 74.20 | 6.23 | 7.21 |
| Found (for $C_{24}H_{24}N_2O_3$) | 74.23 | 6.20 | 7.15 |

Then, 2.0 g of the compound was dissolved in 100 ml of tetrahydrofuran. The resulting solution was circulated for 2 hours at a flow rate of about 2 ml/min. in a stainless steel-made column having an inner diameter of 4 mm and a length of 25 cm in which APS obtained in Example 1 had separately been packed as a slurry to thereby graft thereon N-{(S)-1-phenyl-2-(4-tolyl)ethylcarbamoyl}-D-phenylglycine. Thereafter, tetrahydrofuran, methanol and chloroform were successively flown to effect conditioning of the column (this column will be hereafter simply referred to as PTC-PHG-Si).

Figure 3:
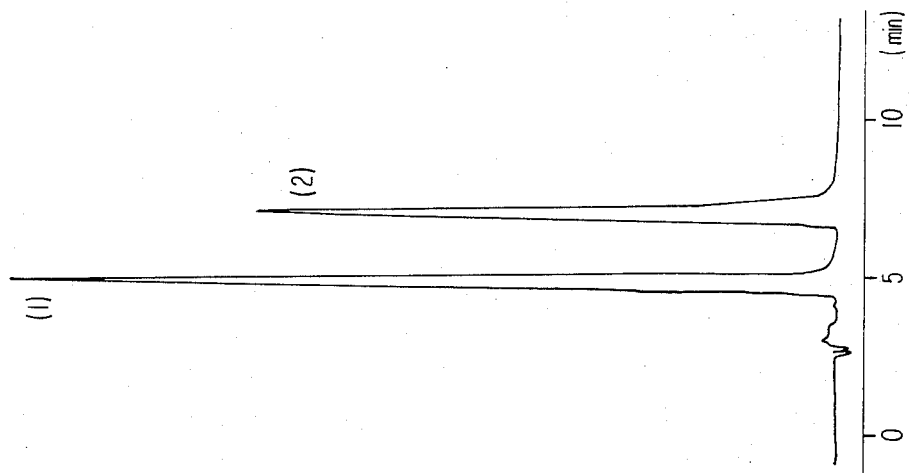

Using this column, N-(3,5-dinitrobenzoyl)-D,L-valine methyl ester was analyzed under the following conditions to obtain a chromatogram shown in FIG. 3.

Temperature: room temperature
Mobile Phase: hexane/dichloromethane/ethanol (15:4:1)
Flow Rate: 1.0 ml/min.
Detector: UV photometer (wavelength 254 nm)

In FIG. 3, peak Nos. (1) and (2) show peaks of N-(3,5-dinitrobenzoyl)-D-valine methyl ester and N-(3,5-dinitrobenzoyl)-L-valine methyl ester, respectively. A time period required for eluting the peak No. (2) was for about 8 minutes, a separation factor was 1.98, and a ratio of the peak area No. (1) to the peak area No. (2) was 50:50.

EXAMPLE 4

3.35 g of S(+)-mandelic acid was dissolved in 30 ml of dry tetrahydrofuran, and 3.0 g of triethylamine was added to the solution. Thereafter, 4.33 g of R(−)-1-(α-naphthyl)ethyl isocyanate obtained in Example 1 was added to the mixture. The resulting mixture was heated under reflux condition for 5 hours on a boiling water bath. After cooling, the solvent was concentrated under reduced pressure. After the condensate was dissolved in 100 ml of an ethyl acetate-hexane (1:1) mixture, the solution was extracted twice with 100 ml of a 5% sodium hydrogencarbonate aqueous solution. The combined extracts were washed once with 50 ml of an ethyl acetate-hexane (1:1) mixture and acidified with 6N hydrochloric acid. The thus formed pale yellow oily substance was extracted twice with 100 ml of ethyl acetate. The extracts were washed twice with 100 ml of water and dried over anhydrous sodium sulfate, followed by concentrating under reduced pressure. Recrystallization was carried out from an ethyl acetate-hexane mixture to obtain 2.9 g of O-{(R)-1-(α-naphthyl)ethylcarbamoyl}-(S)-mandelic acid as white crystals.

Melting Point (Decomposed): 178°–180° C.

Optical Rotation: $[\alpha]_D^{20} = 67.5°$ (c=0.90%, methanol)

Elemental Analysis:

|  | Carbon (%) | Hydrogen (%) | Nitrogen (%) |
|---|---|---|---|
| Calcd. | 72.19 | 5.48 | 4.01 |
| Found (for $C_{21}H_{19}NO_4$) | 72.31 | 5.67 | 3.89 |

Then, 2.0 g of the compound was dissolved in 20 ml of dry tetrahydrofuran. 2.0 g of N-ethoxycarbonyl-2-ethoxy-1,2-dihydroquinoline was added to the solution, and the resulting mixture was stirred at room temperature for 15 minutes. 2.5 g of APS obtained in Example 1 was added thereto to cause suspension. After the suspension was thoroughly degassed under reduced pressure, the mixture was gently stirred overnight at room temperature. The reaction mixture was washed four times with 30 ml of tetrahydrofuran, then twice with 30 ml of methanol and further twice with 30 ml of diethyl ether. After drying, the desired packing material having grafted thereon O-{(R)-1-(α-naphthyl)ethylcarbamoyl}-(S)-mandelic acid (hereafter simply referred to as NEC-MNC-Si) was obtained. The elemental analysis of the packing material showed N: 1.68% and C: 13.6%, which means that about 0.47 mmol of O-{(R)-1-(α-naphthyl)ethylcarbamoyl}-(S)-mandelic acid had been grafted based on 1 g of the packing material.

Figure 4:
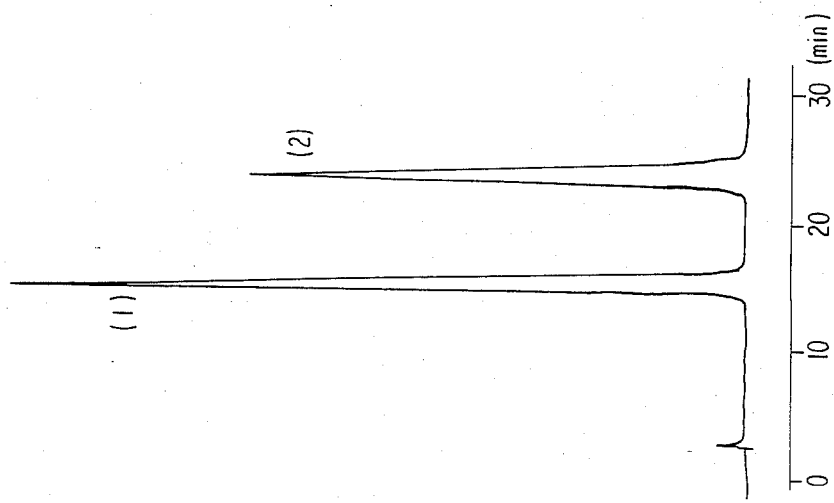

The thus obtained packing material was packed as a slurry in a stainless steel-made column having an inner diameter of 4 mm and a length of 25 cm, and N-(3,5-dinitrobenzoyl-(±)-1-phenyl-2-(4-tolyl)ethylamine was analyzed under the following conditions to obtain a chromatogram shown in FIG. 4.

Temperature: room temperature
Mobile Phase: hexane/dichloromethane/ethanol (15:4:1)
Flow Rate: 1.0 ml/min.
Detector: UV photometer (wavelength 254 nm)

In FIG. 4, peak Nos. (1) and (2) show peaks of N-(3,5-dinitrobenzoyl)-(+)-1-phenyl-2-(4-tolyl)ethylamine and N-(3,5-dinitrobenzoyl)-(−)-1-phenyl-2-(4-tolyl)ethylamine, respectively. A time period required for eluting the peak No. (2) was for about 25 minutes, a separation factor was 1.66, and a ratio of the peak area No. (1) to the peak area No. (2) was 50:50.

EXAMPLE 5

4.69 g of L-valine was dissolved in 40 ml of a 1N sodium hydroxide aqueous solution, and 5 ml of tetrahydrofuran was added to the solution. While stirring, 4.00 g of tert-butyl isocyanate was added, and the stirring was continued overnight at room temperature. After 10 ml of a 1N sodium hydroxide aqueous solution was added to the reaction mixture, the mixture was washed twice with 50 ml of ethyl acetate and acidified with 6N hydrochloric acid. Then, the reaction mixture was extracted twice with 100 ml of ethyl acetate. The extracts were washed twice with 50 ml of a saturated sodium chloride aqueous solution. After drying over anhydrous sodium sulfate and then concentrating under reduced pressure, recrystallization was carried out from an ethyl acetate-hexane mixture to obtain 6.6 g of N-tert-butylcarbamoyl-L-valine as white crystals.

Melting Point (Decomposed): 146°–147° C.

Optical Rotation: $[\alpha]_D^{20} = 13.3°$ (c=1.07%, methanol)

Elemental Analysis:

|  | Carbon (%) | Hydrogen (%) | Nitrogen (%) |
|---|---|---|---|
| Calcd. | 55.53 | 9.32 | 12.95 |
| Found (for $C_{10}H_{20}N_2O_3$) | 55.52 | 9.53 | 12.84 |

Then, 1.7 g of the compound was dissolved in 20 ml of dry tetrahydrofuran, and 2.1 g of N-ethoxycarbonyl-2-ethoxy-1,2-dihydroquinoline was added to the mixture. The solution was stirred for 30 minutes under ice cooling, and 3.0 g of APS obtained in Example 1 was added thereto to cause suspension. After the suspension was thoroughly degassed under reduced pressure, the suspension was gently stirred overnight at room temperature. The reaction mixture was packed in a column having an inner diameter of 8 mm. After the packing material was washed by flowing successively 100 ml of tetrahydrofuran, 200 ml of methanol and 100 ml of chloroform through the column, the packing material was withdrawn from the column and washed twice with 30 ml of diethyl ether. After drying, the desired packing material having grafted thereon N-(tert-butylcarbamoyl)-L-valine (hereafter simply referred to as TBC-VAL-Si) was obtained. The elemental analysis of the packing material showed N: 2.41% and C: 8.90%, which means that about 0.57 mmol of N-(tert-butylcarbamoyl)-L-valine had been grafted based on 1 g of the packing material.

Figure 5:
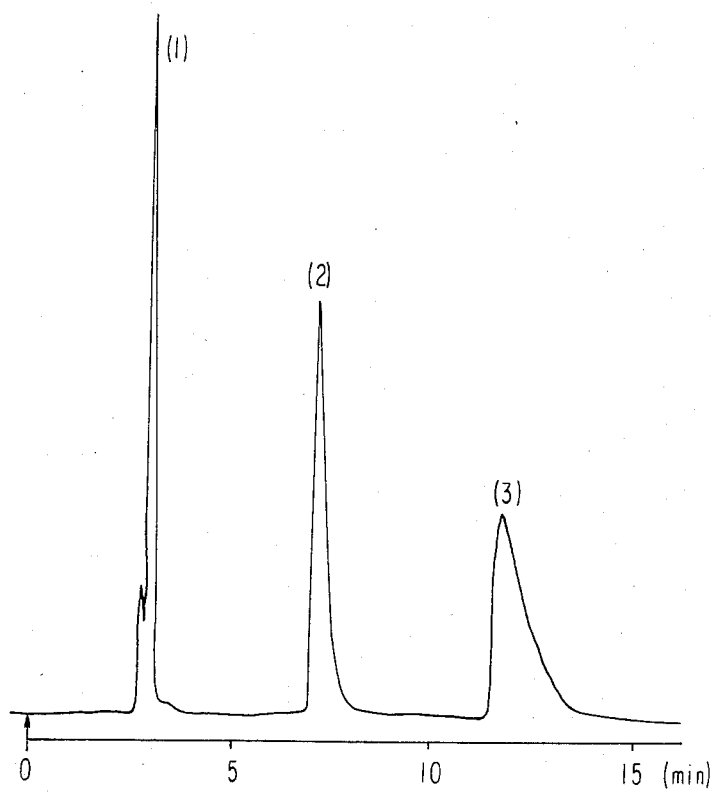

The thus obtained packing material was packed as a slurry in a stainless steel-made column having an inner diameter of 4 mm and a length of 25 cm, and N-acetyl-DL-leucine isopropyl ester was analyzed under the following conditions to obtain a chromatogram shown in FIG. 5.

Temperature: room temperature
Mobile Phase: hexane/isopropanol (24:1)
Flow Rate: 1.0 ml/min.
Detector: UV photometer (wavelength 230 nm)

In FIG. 5, peak Nos. (1), (2) and (3) show peaks of chloroform as the solvent, N-acetyl-D-leucine isopropyl ester and N-acetyl-L-leucine isopropyl ester, respectively. A time period required for eluting the peak No. (3) was for about 13 minutes, a separation factor was 2.03, and a ratio of the peak area No. (2) to the peak area No. (3) was 50:50.

EXAMPLE 6

3.75 g of L-valine was dissolved in 17 ml of a 2N sodium hydroxide aqueous solution. After adding 5 ml of tetrahydrofuran to the solution, 8.9 g of R(—)-1-(α-naphthyl)ethyl isocyanate obtained in Example 1 was added to the mixture while stirring. The stirring was continued for 6 hours at room temperature. After 10 ml of a 1N sodium hydroxide aqueous solution was added to the reaction mixture, the mixture was washed three times with 50 ml of ethyl acetate and acidified with 6N hydrochloric acid. The formed white crystals were extracted six times with 100 ml of ethyl acetate. The extracts were washed twice with 100 ml of a saturated sodium chloride aqueous solution. After drying over anhydrous sodium sulfate and then concentrating under reduced pressure, recrystallization was carried out from an ethyl acetate-hexane mixture to obtain 5.9 g of N-{(R)-1-(α-naphthyl)ethylcarbamoyl}-L-valine as white crystals.

Melting Point (decomposed): 189°–190° C.

Optical Rotation: $[\alpha]_D^{20} = -20°$ (c=1.10%, methanol)

Elemental Analysis:

|  | Carbon (%) | Hydrogen (%) | Nitrogen (%) |
|---|---|---|---|
| Calcd. | 68.77 | 7.05 | 8.91 |
| Found (for $C_{18}H_{22}N_2O_3$) | 68.47 | 7.22 | 8.87 |

Then, 1.6 g of the compound was taken, and 20 ml of dry tetrahydrofuran and 15 ml of dry dioxane were added thereto to thereby dissolve therein a major part of the compound. 1.36 g of N-ethoxycarbonyl-2-ethoxy-1,2-dihydroquinoline was further added thereto to complete the dissolution. The resulting solution was stirred for 1 hour under ice cooling. 2.5 g of APS obtained in Example 1 was added to the solution to cause suspension. After the suspension was thoroughly degassed under reduced pressure, the suspension was gently stirred overnight at room temperature. The reaction mixture was packed in a column having an inner diameter of 8 mm. After the packing material was washed by flowing successively 100 ml of tetrahydrofuran, 200 ml of methanol and 100 ml of chloroform through the column, the packing material was withdrawn from the column and washed twice with 30 ml of diethyl ether. After drying, the desired packing material having grafted thereon N-{(R)-1-(α-naphthyl)ethylcarbamoyl}-L-valine (hereafter simply referred to as RNC-VAL-Si) was obtained. The elemental analysis of the packing material showed N: 2.06% and C: 10.36%, which means that about 0.45 mmol of N-{(R)-1-(α-naphthyl)ethylcarbamoyl}-L-valine had been grafted based on 1 g of the packing material.

Figure 6:
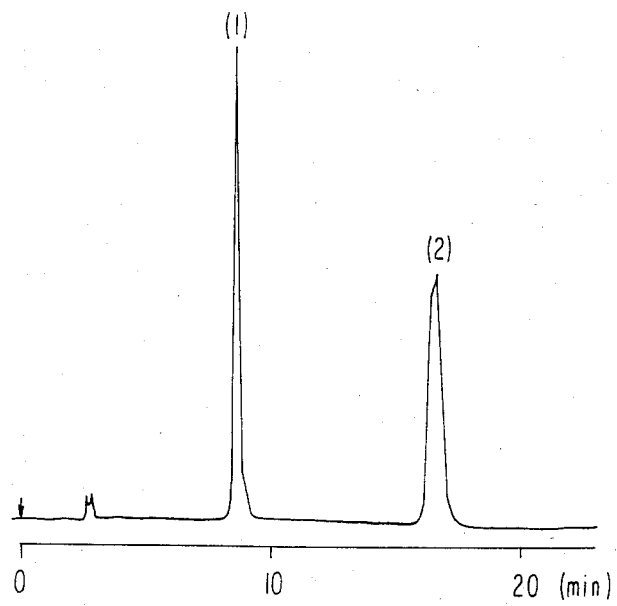

The thus obtained packing material was packed as a slurry in a stainless steel-made column having an inner diameter of 4 mm and a length of 25 cm, and N-(3,5-dinitrobenzoyl)-(R,S)-1-phenylethylamine was analyzed under the following conditions to obtain a chromatogram shown in FIG. 6.

Temperature: room temperature

Mobile Phase: hexane/dichloromethane/ethanol (15:4:1)

Flow Rate: 1.0 ml/min.

Detector: UV photometer (wavelength 254 nm)

In FIG. 6, peak Nos. (1) and (2) show peaks of N-(3,5-dinitrobenzoyl)-(S)-1-phenylethylamine and N-(3,5-dinitrobenzoyl)-(R)-1-phenylethylamine, respectively. A time period required for eluting the peak No. (2) was for about 18 minutes, a separation factor was 2.31, and a ratio of the peak area No. (1) to the peak area No. (2) was 50:50.

EXAMPLE 7

Enantiomer mixtures of the following compounds were separated using each of columns prepared by slurry packing each of packing materials i.e., NEC-Si obtained in Example 1, NEC-PHG-Si obtained in Example 2, NEC-MNC-Si obtained in Example 4, TBC-VAL-Si obtained in Example 5 and RNC-VAL-Si obtained in Example 6, further a packing material having grafted N-isopropylcarbamoyl-D-phenylglycine synthesized in a manner similar to Example 2 (hereafter simply referred to as IPC-PHG-Si), a packing material having grafted thereon O-isopropylcarbamoyl-(R)-mandelic acid synthesized in a manner similar to Example 4 (hereafter simply referred to as IPC-MND-Si), each of packing materials having grafted thereon N-isopropylcarbamoyl-L-valine, N-n-propylcarbamoyl-L-valine and N-phenylcarbamoyl-L-valine synthesized in a manner similar to Example 5, respectively (hereafter simply referred to as IPC-VAL-Si, PRC-VAL-Si, and PHC-VAL-SI, respectively) and a packing material having grafted thereon N-{(S)-1-(α-naphthyl)ethylcarbamoyl}-L-valine (hereafter simply referred to as SNC-VAL-Si), in a stainless steel-made column having an inner diameter of 4 mm and a length of 25 cm, respectively, and, a PTC-PHC-Si column obtained in Example 3, further each of columns (hereafter simply referred to as PEC-PHG-Si, DNC-PHG-Si, NEC-MNI-Si, DNC-MND-Si and NPC-MND-Si, respectively) prepared by grafting N-{(R)-1-phenylethylcarbamoyl}-D-phenylglycine and N-(3,5-dinitrophenylcarbamoyl)-D-phenylglycine obtained in a manner similar to Example 2 or Example 3, O-{(R)-1-(α-naphthyl)ethylcarbamoyl}-(S)-mandelic acid obtained in Example 4, and O-(3,5-dinitrophenylcarbamoyl)-(S)-mandelic acid and O-(α-naphthylcarbamoyl)-(S)-mandelic acid prepared in a manner similar to Example 4, on APS packed in each of a stainless steel-made column having an inner diameter of 4 mm and a length of 25 cm, within the column. Thus, a separation factor was determined with each of them.

Temperature: room temperature

Flow Rate in Mobile Phase: 1 ml/min.

Detector: UV photometer (wavelength 254 nm or 230 nm)

The results are shown in Tables 1 through 9.

TABLE 1

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-1 | N—Ac—(±)-1-(α-naphthyl)ethylamine | DNC—PHG—Si | D | 2.88 | 3.82 | 1.33 |
| 7-2 | N—Ac—(±)-1-(α-naphthyl)ethylamine | NEC—MNC—Si | B | 2.61 | 3.04 | 1.16 |
| 7-3 | N—Ac—(±)-1-(α-naphthyl)ethylamine | SNC—VAL—Si | C | 2.36 | 2.67 | 1.13 |
| 7-4 | N—Ac—(±)-1-phenyl-2-(4-tolyl)ethylamine | DNC—MND—Si | D | 1.92 | 2.08 | 1.08 |
| 7-5 | N—Ac—(±)-1-phenylethylamine | SNC—VAL—Si | B | 2.47 | 2.67 | 1.08 |

TABLE 1-continued

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-6 | N—Isb—(±)-1-phenylethylamine | DNC—MND—Si | C | 2.82 | 3.27 | 1.16 |
| 7-7 | N—Isb—(±)-1-phenylethylamine | NEC—MNC—Si | A | 4.25 | 5.09 | 1.20 |
| 7-8 | N—Bz—(±)-1-phenylethylamine | DNC—PHG—Si | C | 3.32 | 3.72 | 1.12 |
| 7-9 | N—DMB—(±)-1-phenylethylamine | DNC—MND—Si | C | 2.84 | 3.73 | 1.31 |
| 7-10 | N—DCB—(±)-1-phenylethylamine | NEC—MNC—Si | A | 4.18 | 5.60 | 1.34 |
| 7-11 | N—DNB—(±)-1-(α-naphthyl)ethylamine | NEC—MNI—Si | D | 2.50 | 14.37 | 5.75 |
| 7-12 | N—DNB—(±)-1-phenyl-2-(4-tolyl)ethylamine | NEC—MNI—Si | D | 3.84 | 7.05 | 1.84 |
| 7-13 | N—DNB—(±)-1-phenyl-2-(4-tolyl)ethylamine | RNC—VAL—Si | D | 4.10 | 5.62 | 1.37 |
| 7-14 | N—DNB—(±)-1-phenylethylamine | NEC—MNC—Si | D | 2.87 | 7.15 | 2.49 |
| 7-15 | N—DNB—(±)-2-octylamine | PEC—PHG—Si | C | 3.06 | 4.17 | 1.36 |
| 7-16 | N—DNB—(±)-2-butylamine | PTC—PHG—Si | D | 1.64 | 1.83 | 1.12 |

[1]AC: acetyl; Isb: isobutyryl; Bz: benzoyl; DMB: 3,5-dimethylbenzoyl; DCB: 3,5-dichloro benzoyl; DNB: 3,5-dinitrobenzoyl.
[2]A: hexane/isopropanol (39:1); B: hexane/1,2-dichloroethane/ethanol (48:15:1); C: hexane/dichloromethane/ethanol (50:10:1); D: hexane/dichloromethane/ethanol (15:4:1).

TABLE 2

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-17 | N—DNB—(±)-1-(α-naphthyl)ethylamine | NEC—MNC—Si | A | 1.27 | 4.67 | 3.68 |
| 7-18 | N—DNB—(±)-1-(α-naphthyl)ethylamine | SNC—VAL—Si | B | 1.97 | 4.59 | 2.33 |
| 7-19 | N—DNB—(±)-1-phenyl-2-(4-tolyl)ethylamine | SNC—VAL—Si | B | 3.11 | 3.57 | 1.15 |
| 7-20 | N—DNB—(±)-1-phenyl-2-(4-tolyl)ethylamine | NEC—MNC—Si | A | 2.11 | 3.13 | 1.48 |
| 7-21 | N—DNB—(±)-1-phenylethylamine | NEC—MNC—Si | A | 0.76 | 1.48 | 1.95 |
| 7-22 | N—DNB—(±)-1-phenylethylamine | SNC—VAL—Si | B | 1.12 | 1.66 | 1.48 |
| 7-23 | N—DNB—(±)-2-butylamine | NEC—MNC—Si | B | 1.04 | 1.16 | 1.12 |
| 7-24 | N—DNB—(±)-2-ethylpiperidine | DNC—MND—Si | C | 3.90 | 4.19 | 1.07 |
| 7-25 | N—DNPC—(±)-2-ethylpiperidine | RNC—VAL—Si | F | 27.86 | 30.73 | 1.10 |
| 7-26 | N—DNPC—(±)-2-ethylpiperidine | PTC—PHG—Si | H | 2.47 | 2.66 | 1.08 |
| 7-27 | N—DNB—DL-proline methyl ester | DNC—MND—Si | G | 9.03 | 10.03 | 1.11 |
| 7-28 | N—DNB—DL-proline methyl ester | NEC—MNC—Si | H | 3.98 | 5.75 | 1.44 |
| 7-29 | N—DNPC—DL-proline methyl ester | RNC—VAL—Si | H | 3.17 | 4.47 | 1.41 |
| 7-30 | N—DNPC—(±)-N-methyl-1-phenylethylamine | RNC—VAL—Si | D | 2.58 | 3.47 | 1.34 |
| 7-31 | N—DNPC—(±)-N-methyl-1-phenylethylamine | SNC—VAL—Si | D | 2.22 | 3.38 | 1.52 |
| 7-32 | N—DNPC—(±)-N-methyl-1-phenylethylamine | NEC—PHG—Si | E | 3.68 | 5.07 | 1.38 |

[1]DNB: 3,5-dinitrobenzoyl; DNPC: 3,5-dinitrophenylcarbamoyl
[2]A: methanol/water (17:3); B: methanol/water (7:3); C: hexane/1,2-dichloroethane/ethanol (48:15:1); D: hexane/1,2-dichloroethane/ethanol (10:4:1); E: hexane/1,2-dichloroethane/ethanol (4:2:1); F: hexane/dichloromethane/ethanol (100:20:1); G: hexane/dichloromethane/ethanol (50:10:1); H: hexane/dichloromethane/ethanol (15:4:1).

TABLE 3

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-33 | (±)-2-phenylpropionic acid-DNA | SNC—VAL—Si | D | 2.56 | 7.40 | 2.89 |
| 7-34 | (±)-2-phenylpropionic acid-DNA | NEC—Si | D | 3.47 | 7.10 | 2.05 |
| 7-35 | (±)-2-(4-chlorophenyl)isovaleric acid methylamide | NEC—PHG—Si | A | 11.08 | 12.37 | 1.12 |
| 7-36 | (±)-2-(4-chlorophenyl)isovaleric acid t-butylamide | NEC—PHG—Si | A | 1.02 | 1.12 | 1.10 |
| 7-37 | (±)-2-(4-chlorophenyl)isovaleric acid anilide | NEC—MNC—Si | A | 5.26 | 6.02 | 1.14 |
| 7-38 | (±)-2-(4-chlorophenyl)isovaleric acid-DCA | NEC—MNC—Si | A | 4.00 | 5.98 | 1.50 |
| 7-39 | (±)-2-(4-chlorophenyl)isovaleric acid-DNA | RNC—VAL—Si | D | 2.48 | 6.21 | 2.50 |
| 7-40 | (±)-2-bromo-3,3-dimethylbutyric acid-DNA | PTC—PHG—Si | D | 3.51 | 5.16 | 1.47 |
| 7-41 | (±)-2-bromo-3,3-dimethylbutyric acid-DNA | NPC—MND—Si | C | 8.22 | 9.37 | 1.14 |
| 7-42 | (±)-2-bromo-3,3-dimethylbutyric acid-DNA | DNC—PHG—Si | C | 4.31 | 5.11 | 1.19 |
| 7-43 | (±)-cis-chrysanthemic acid-DNA | NEC—PHG—Si | D | 3.81 | 5.48 | 1.44 |
| 7-44 | (±)-cis-chrysanthemic acid-DNA | NPC—MND—Si | C | 6.13 | 7.09 | 1.16 |
| 7-45 | (±)-cis-chrysanthemic acid-DNA | IPC—MND—Si | B | 7.42 | 8.30 | 1.12 |
| 7-46 | (±)-trans-chrysanthemic acid-DNA | NEC—PHG—Si | D | 3.17 | 3.81 | 1.20 |
| 7-47 | (±)-trans-chrysanthemic acid-DNA | RNC—VAL—Si | D | 1.86 | 2.13 | 1.15 |
| 7-48 | (±)-trans-chrysanthemic acid-DNA | IPC—MND—Si | B | 6.03 | 6.63 | 1.10 |

[1]DNA: 3,5-dinitroanilide; DCA: 3,5-dichloroanilide
[2]A: hexane/isopropanol (39:1); B: hexane/1,2-dichloroethane/ethanol (100:20:1); C: hexane/dichloromethane/ethanol (50:10:1); D: hexane/dichloromethane/ethanol (15:4:1).

TABLE 4

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-49 | (±)-cis-chrysanthemic acid-DCA | NEC—PHG—Si | C | 4.28 | 5.16 | 1.21 |
| 7-50 | (±)-trans-chrysanthemic acid-DCA | NEC—PHG—Si | C | 3.72 | 4.23 | 1.14 |
| 7-51 | (±)-2-(4-chlorophenyl)isovaleric acid-DNA | NEC—MNC—Si | A | 1.12 | 1.96 | 1.75 |
| 7-52 | N—DNB—DL-alanine n-butylamide | NEC—MNC—Si | B | 0.91 | 1.05 | 1.15 |
| 7-53 | N—DNB—DL-alanine n-butylamide | TBC—VAL—Si | E | 2.65 | 4.13 | 1.56 |
| 7-54 | N—DNB—DL-alanine n-butylamide | IPC—VAL—Si | D | 10.59 | 17.15 | 1.62 |
| 7-55 | N—DNB—DL-valine n-butylamide | NEC—Si | F | 1.08 | 2.14 | 1.98 |
| 7-56 | N—DNB—DL-valine n-butylamide | TBC—VAL—Si | E | 1.06 | 2.40 | 2.27 |

TABLE 4-continued

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-57 | N—DNB—DL-valine n-butylamide | IPC—VAL—Si | D | 3.79 | 8.08 | 2.13 |
| 7-58 | N—DNB—DL-valine n-butylamide | NEC—MNC—Si | B | 1.24 | 1.96 | 1.58 |
| 7-59 | N—DNB—DL-phenylalanine n-butylamide | IPC—PHG—Si | E | 7.89 | 11.30 | 1.43 |
| 7-60 | N—DNB—DL-phenylalanine n-butylamide | TBC—VAL—Si | E | 1.51 | 2.37 | 1.57 |
| 7-61 | N—DNB—DL-phenylglycine n-butylamide | IPC—VAL—Si | D | 6.05 | 12.41 | 2.05 |
| 7-62 | N—DNB—DL-phenylglycine n-butylamide | NEC—MNI—Si | F | 3.58 | 4.98 | 1.39 |
| 7-63 | N—DNB—DL-phenylalanine methyl ester | NEC—MNC—Si | B | 0.96 | 1.29 | 1.34 |
| 7-64 | N—DNB—DL-valine methyl ester | NEC—MNC—Si | B | 1.18 | 2.08 | 1.76 |

[1]DCA: 3,5-dichloroanilide; DNA: 3,5-dinitroanilide; DNB: 3,5-dinitrobenzoyl
[2]A: methanol/water (17:3); B: methanol/water (7:3); C: hexane/isopropanol (49:1); D: hexane/1,2-dichloroethane/ethanol (100:20:1); E: hexane/1,2-dichloroethane/ethanol (48:15:1); F: hexane/dichloromethane/ethanol (50:10:1).

TABLE 5

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-65 | N—Ac—DL-alanine methyl ester | TBC—VAL—Si | B | 9.37 | 11.33 | 1.21 |
| 7-66 | N—Ac—DL-alanine ethyl ester | IPC—VAL—Si | B | 4.02 | 4.90 | 1.22 |
| 7-67 | N—Ac—DL-alanine isopropyl ester | PHC—VAL—Si | B | 4.13 | 5.37 | 1.30 |
| 7-68 | N—Ac—DL-alanine tert-butyl ester | IPC—VAL—Si | B | 1.88 | 2.69 | 1.43 |
| 7-69 | N—Ac—DL-valine methyl ester | TBC—VAL—Si | B | 3.54 | 5.22 | 1.47 |
| 7-70 | N—Ac—DL-valine ethyl ester | PRC—VAL—Si | B | 1.69 | 2.33 | 1.38 |
| 7-71 | N—Ac—DL-valine isopropyl ester | PHC—VAL—Si | B | 2.01 | 2.85 | 1.42 |
| 7-72 | N—Ac—DL-valine tert-butyl ester | PRC—VAL—Si | B | 0.91 | 1.50 | 1.65 |
| 7-73 | N—Ac—DL-leucine methyl ester | IPC—VAL—Si | B | 2.76 | 3.55 | 1.29 |
| 7-74 | N—Ac—DL-leucine ethyl ester | PRC—VAL—Si | B | 1.78 | 2.60 | 1.46 |
| 7-75 | N—Ac—DL-leucine isopropyl ester | PHC—VAL—Si | B | 2.08 | 3.20 | 1.54 |
| 7-76 | N—Ac—DL-leucine tert-butyl ester | PRC—VAL—Si | B | 0.92 | 1.63 | 1.77 |
| 7-77 | N—Ac—DL-isoleucine methyl ester | TBC—VAL—Si | B | 3.04 | 4.82 | 1.59 |
| 7-78 | N—Ac—DL-phenylglycine methyl ester | IPC—VAL—Si | B | 4.94 | 5.51 | 1.12 |
| 7-79 | N—Ac—DL-phenylalanine methyl ester | TBC—VAL—Si | B | 3.54 | 5.22 | 1.47 |
| 7-80 | N—TFA—DL-leucine isopropyl ester | IPC—VAL—Si | A | 2.30 | 3.73 | 1.62 |

[1]Ac: acetyl; TFA: trifluoroacetyl
[2]A: hexane/isopropanol (999:1); B: hexane/isopropanol (24:1)

TABLE 6

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-81 | N—DNB—DL-alanine methyl ester | SNC—VAL—Si | C | 1.49 | 2.77 | 1.86 |
| 7-82 | N—DNB—DL-alanine methyl ester | NPC—MND—Si | C | 7.06 | 8.87 | 1.26 |
| 7-83 | N—DNB—DL—valine methyl ester | IPC—PHG—Si | A | 5.88 | 7.33 | 1.25 |
| 7-84 | N—DNB—DL-valine methyl ester | RNC—VAL—Si | C | 1.20 | 2.29 | 1.91 |
| 7-85 | N—DNB—DL-valine methyl ester | PEC—PHG—Si | D | 0.87 | 0.99 | 1.14 |
| 7-86 | N—DNB—DL-leucine methyl ester | NEC—Si | D | 1.12 | 1.95 | 1.74 |
| 7-87 | N—DNB—DL-leucine methyl ester | SNC—VAL—Si | D | 0.79 | 1.14 | 1.44 |
| 7-88 | N—DNB—DL-methionine methyl ester | SNC—VAL—Si | D | 1.40 | 2.87 | 2.05 |
| 7-89 | N—DNB—DL-phenylalanine methyl ester | IPC—PHG—Si | A | 2.95 | 3.58 | 1.21 |
| 7-90 | N—DNB—DL-phenylglycine methyl ester | SNC—VAL—Si | D | 1.42 | 1.88 | 1.32 |
| 7-91 | N—DNB—DL-aspargic acid dimethyl ester | RNC—VAL—Si | D | 2.50 | 3.09 | 1.24 |
| 7-92 | N—DNB—DL-glutamic acid dimethyl ester | RNC—VAL—Si | D | 1.98 | 3.46 | 1.75 |
| 7-93 | N—DNB—DL-glutamic acid dimethyl ester | SNC—VAL—Si | D | 1.42 | 3.28 | 2.31 |
| 7-94 | N—DNB—DL-tryptophan methyl ester | DNC—MND—Si | D | 7.29 | 10.97 | 1.50 |
| 7-95 | N—DNB—DL-tryptophan methyl ester | SNC—VAL—Si | D | 5.83 | 9.87 | 1.69 |
| 7-96 | N,N—bis-DNB—DL-lisine methyl ester | RNC—VAL—Si | D | 8.58 | 18.99 | 2.21 |

[1]DNB: 3,5-dinitrobenzoyl
[2]A: hexane/1,2-dichloroethane/ethanol (100:20:1); B: hexane/1,2-dichloroethane/ethanol (48:15:1); C: hexane/dichloromethane/ethanol (50:10:1); D: hexane/dichloromethane/ethanol (15:4:1).

TABLE 7

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-97 | O—DNB—(±)-1-phenylethyl alcohol | NEC—MNC—Si | A | 2.57 | 2.85 | 1.11 |
| 7-98 | O—DNB—(±)-1-(α-naphthyl)ethyl alcohol | NEC—MNC—Si | A | 3.65 | 3.95 | 1.08 |
| 7-99 | (R,S)-4-hydroxy-3-methyl-2-(2-propenyl)-2-cyclopenten-1-one | RNC—VAL—Si | A | 10.57 | 11.56 | 1.09 |
| 7-100 | (R,S)-4-hydroxy-3-methyl-2-(2-propenyl)-2-cyclopenten-1-one | RNC—VAL—Si | A | 18.62 | 19.94 | 1.07 |
| 7-101 | O—DNPC—(±)-2-octyl alcohol | SNC—VAL—Si | B | 2.54 | 2.90 | 1.14 |
| 7-102 | O—DNPC—(±)-2-octyl alcohol | PEC—PHG—Si | B | 2.50 | 2.92 | 1.17 |
| 7-103 | O—DNPC—(±)-1-phenylethyl alcohol | SNC—VAL—Si | C | 1.43 | 2.20 | 1.54 |
| 7-104 | O—DNPC—(±)-1-(α-naphthyl)ethyl alcohol | DNC—PHG—Si | C | 1.70 | 2.45 | 1.44 |
| 7-105 | O—DNPC—(±)-1-(α-naphthyl)ethyl alcohol | NEC—MNC—Si | B | 6.02 | 7.15 | 1.19 |
| 7-106 | O—DNPC—(±)-menthol | NEC—PHG—Si | B | 2.70 | 3.17 | 1.17 |

TABLE 7-continued

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-107 | O—DNPC—(±)-4-methyl-2-pentanol | NEC—PHG—Si | B | 3.77 | 4.16 | 1.10 |
| 7-108 | O—DNPC—(±)-1-methoxy-2-propanol | NEC—PHG—Si | B | 7.55 | 8.76 | 1.16 |
| 7-109 | O—DNPC—(±)-benzoin | NEC—PHG—Si | B | 11.64 | 14.15 | 1.22 |
| 7-110 | O—DNPC—(±)-(R,S)-4-hydroxy-3-methyl-2-(2-propenyl)-2-cyclopenten-1-one | NEC—PHG—Si | C | 4.56 | 5.25 | 1.15 |
| 7-111 | O—DNPC—(±)-(R,S)-4-hydroxy-3-methyl-2-(2-propenyl)-2-cyclopenten-1-one | SNC—VAL—Si | C | 2.08 | 2.27 | 1.09 |
| 7-112 | O—DNPC—(±)-(R,S)-4-hydroxy-3-methyl-2-(propenyl)-2-cyclopenten-1-one | NEC—PHG—Si | C | 7.47 | 8.46 | 1.13 |

[1]DNB: 3,5-dinitrobenzoyl; DNPC: 3,5-dinitrophenylcarbamoyl
[2]A: hexane/isopropanol (39:1); B: hexane/dichloromethane/ethanol (50:10:1); C: hexane/dichloromethane/ethanol (15:4:1)

TABLE 8

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-113 | O—PHC—(±)-lactic acid methyl ester | TBC—VAL—Si | B | 6.79 | 10.50 | 1.55 |
| 7-114 | O—NPC—(±)-lactic acid methyl ester | TBC—VAL—Si | B | 7.39 | 8.73 | 1.18 |
| 7-115 | O—DNPC—(±)-lactic acid methyl ester | TBC—VAL—Si | C | 1.27 | 2.55 | 2.01 |
| 7-116 | O—DNPC—(±)-malic acid diethyl ester | SNC—VAL—Si | D | 1.13 | 1.56 | 1.38 |
| 7-117 | O—DNPC—(±)-malic acid diethyl ester | IPC—VAL—SI | C | 0.95 | 1.36 | 1.43 |
| 7-118 | O—DNB—(±)-mandelic acid methyl ester | NEC—MNC—Si | A | 6.60 | 7.10 | 1.08 |
| 7-119 | O—PHC—(±)-mandelic acid methyl ester | TBC—VAL—Si | B | 8.97 | 11.64 | 1.30 |
| 7-120 | O—DNPC—(±)-mandelic acid methyl ester | TBC—VAL—Si | C | 0.99 | 1.53 | 1.55 |
| 7-121 | O—DNPC—(±)-mandelic acid methyl ester | IPC—VAL—Si | C | 1.29 | 1.70 | 1.32 |
| 7-122 | O—DNPC—(±)-mandelic acid methyl ester | SNC—VAL—Si | D | 1.52 | 2.27 | 1.49 |
| 7-123 | O—DNPC—(±)-mandelic acid methyl ester | PHC—VAL—Si | C | 1.02 | 1.60 | 1.57 |
| 7-124 | O—DNPC—(±)-2-hydroxycapric acid methyl ester | TBC—VAL—Si | C | 0.45 | 1.13 | 2.51 |
| 7-125 | O—DNPC—(±)-2-hydroxycapric acid methyl ester | PRC—VAL—Si | C | 0.47 | 0.86 | 1.83 |
| 7-126 | O—DNPC—(±)-pantoyl lactone | SNC—VAL—Si | D | 2.39 | 4.36 | 1.82 |
| 7-127 | O—DNPC—(±)-pantoyl lactone | TBC—VAL—Si | C | 1.92 | 3.24 | 1.69 |
| 7-128 | O—DNPC—(±)-pantoyl lactone | NEC—Si | D | 3.24 | 5.25 | 1.62 |

[1]PHC: phenylcarbamoyl; NPC: α-naphthylcarbamoyl; DNPC: 3,5-dinitrophenylcarbamoyl; DNB: 3,5-dinitrobenzoyl
[2]A: hexane/isopropanol (39:1); B: hexane/1,2-dichloroethane/ethanol (250:20:1); C: hexane/1,2-dichloroethane/ethanol (48:15:1); D: hexane/dichloromethane/ethanol (15:4:1).

TABLE 9

| Example No. | Compound Analyzed[1] | Packing Material | Mobile Phase[2] | Capacity Factor (k') First Peak | Capacity Factor (k') Second Peak | Separation Factor (α) |
|---|---|---|---|---|---|---|
| 7-129 | N,O—bis(DNB)-(±)-2-amino-1-butanol | SNC—VAL—Si | C | 2.62 | 3.13 | 1.19 |
| 7-130 | N,O—bis(DNB)-(±)-2-amino-1-butanol | PTC—PHG—Si | B | 5.90 | 9.19 | 1.56 |
| 7-131 | N,O—bis(DNB)-(±)-2-amino-1-butanol | IPC—VAL—Si | A | 10.57 | 13.05 | 1.23 |
| 7-132 | N,O—bis(DNB)-(±)-2-amino-1,1-diphenyl-1-propanol | SNC—VAL—Si | C | 1.46 | 4.17 | 2.86 |
| 7-133 | N,O—bis(DNB)-(±)-2-amino-1,1-diphenyl-1-propanol | NEC—PHG—Si | C | 2.86 | 10.76 | 3.76 |
| 7-134 | N,O—bis(DNPC)-(±)-2-amino-1-butanol | SNC—VAL—Si | D | 2.09 | 2.67 | 1.28 |
| 7-135 | N,O—bis(DNPC)-(±)-2-amino-1-butanol | NEC—MNI—Si | F | 6.69 | 7.77 | 1.16 |
| 7-136 | N,O—bis(DNPC)-(±)-1-amino-2-propanol | SNC—VAL—Si | D | 6.04 | 7.30 | 1.21 |
| 7-137 | N,O—bis(DNPC)-(±)-1-amino-2-propanol | NEC—Si | E | 2.80 | 3.42 | 1.22 |
| 7-138 | N,O—bis(DNPC)-(±)-propranolol | SNC—VAL—Si | C | 3.56 | 6.88 | 1.93 |
| 7-139 | N,O—bis(DNPC)-(±)-propranolol | RNC—VAL—Si | C | 4.24 | 6.85 | 1.62 |
| 7-140 | N,O—bis(DNPC)-(±)-propranolol | TBC—VAL—Si | B | 2.29 | 3.00 | 1.31 |

[1]DNB: 3,5-dinitrobenzoyl; DNPC: 3,5-dinitrophenylcarbamoyl
[2]A: hexane/1,2-dichloroethane/ethanol (48:15:1); B: hexane/1,2-dichloroethane/ethanol (20:6:1); C: hexane/1,2-dichloroethane/ethanol (10:4:1); D: hexane/1,2-dichloroethane/ethanol (4:2:1); E: chloroform/ethanol (9:1); F: chloroform/ethanol (3:1).

While the invention has been described in detail and with reference to specific embodiments thereof, it will be apparent to one skilled in the art that various changes and modifications can be made therein without departing from the spirit and scope thereof.

What is claimed is:

1. A packing material for chromatographic use which comprises an inorganic carrier having hydroxyl groups at the surface thereof to which an organosilane derivative selected from the group consisting of an N-carbamoyl amino acid derivative obtained by reacting an optically active amino acid carbamoylated by isocyanate with an aminoalkylsilane and an O-carbamoyl hydroxy acid derivative obtained by reacting an optically active hydroxy acid carbamoylated by isocyanate with an aminoalkylsilane is grafted.

2. A packing material for chromatographic use as claimed in claim 1, wherein said organosilane derivative is an organosilane represented by the general formula:

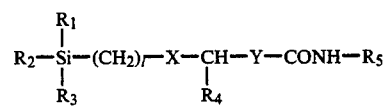

wherein $R_1$, $R_2$ and $R_3$ each, which may be the same or different, is an alkyl group, an alkoxy group, a hydroxyl group or a halogen atom, with the proviso that at least one of $R_1$, $R_2$ and $R_3$ is an alkoxyl group or a halogen atom; $R_4$ is an alkyl group, an aryl group or an aralkyl group; $R_5$ is an alkyl group, an aryl group or an aralkyl group which may be substituted with an aryl group including those groups which are optically active substituents; X is an —NHCO— group or an —N$^\oplus$H$_3$.O$^\ominus$CO— group; Y is an —NH— group or an oxygen atom; and l is 2, 3 or 4.

3. A packing material for chromatographic use as claimed in claim 1, wherein said inorganic carrier having hydroxyl groups at the surface thereof is silica gel.

4. A packing material for chromatographic use as claimed in claim 2, wherein the aminoalkylsilane residue in general formula (I) is an ω-aminopropyltriethoxysilane residue or an ω-aminopropyltrichlorosilane residue.

5. A packing material for chromatographic use as claimed in the claim 2, wherein in general formula $R_4$ is an isopropyl group or a phenyl group; and $R_5$ is an n-propyl group, an isopropyl group, a tert-butyl group, a phenyl group, a 3,5-dinitrophenyl group, an α-naphthyl group, an optically active 1-(α-naphthyl)ethyl group, an optically active 1-phenylethyl group, or an optically active 1phenyl-2-2-(4-tolyl)ethyl group.

6. A packing material for chromatographic use as claimed in the claim 2, wherein in general formula; $R_4$ is an isopropyl group or a phenyl group; and $R_5$ is a tert-butyl group or an optically active 1-(α-naphthyl)ethyl group.

7. A method for liquid chromatography analysis which comprises separating and analyzing an enantiomer mixture of a compound having an —OH group, a —CONH— group, $$a \text{—CON—} \text{ group,}$$
$$\quad\quad |$$

a —COO— group, an —NHCOO— group, an —NHCONH— group or an $$an \text{—NHCON—} \text{ group}$$
$$\quad\quad\quad\quad |$$

bonded to an asymmetric carbon atom thereof by using a packing material for chromatographic use obtained by grafting on an inorganic carrier having hydroxyl groups at the surface thereof an organosilane derivative selected from the group consisting of an N-carbamoyl amino acid derivative obtained by reacting an optically active amino acid carbamoylated by isocyanate with an aminoalkylsilane and an O-carbamoyl hydroxy acid derivative obtained by reacting an optically active hydroxy acid carbamoylated by isocyanate with an aminoalkylsilane.

8. A method for analysis as claimed in claim 7, wherein said organosilane derivative is an organosilane represented by the general formula:

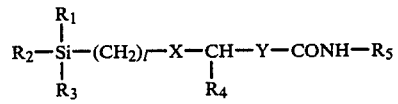

wherein $R_1$, $R_2$ and $R_3$ each, which may be the same or different, is an alkyl group, an alkoxyl group, a hydroxyl group or a halogen atom, with the proviso that at least one of $R_1$, $R_2$ and $R_3$ is an alkoxyl group or a halogen atom; $R_4$ is an alkyl group, an aryl group or an aralkyl group; $R_5$ is an alkyl group, an aryl group or an aralkyl group which may be substituted with an aryl group including those groups being optically active substituents; X is an —NHCO— group or an —N$^\oplus$H$_3$.O$^\ominus$CO— group; Y is an —NH— group or an oxygen atom; and l is 2, 3 or 4.

9. A method for analysis as claimed in claim 7, wherein said inorganic carrier having hydroxyl groups at the surface thereof is silica gel.

10. A method for analysis as claimed in claim 8, wherein the aminoalkylsilane residue in the general formula is an ω-aminopropyltriethoxysilane residue or an ω-aminopropyltrichlorosilane residue.

11. A method for analysis as claimed in claim 8, wherein in the general formula; $R_4$ is an isopropyl group or a phenyl group; and $R_5$ is an n-propyl group, an isopropyl group, a tert-butyl group, a phenyl group, a 3,5-dinitrophenyl group, an α-naphthyl group, an optically active 1-(α-naphthyl)ethyl group, an optically active 1-phenylethyl group or an optically active 1-phenyl-2-(4-tolyl)ethyl group.

12. A method for analysis as claimed in claim 8, wherein in the general formula $R_4$ is an isopropyl group or a phenyl group; and $R_5$ is a tert-butyl group or an optically active 1-(α-naphthyl)ethyl group.

* * * * *